(12) United States Patent
Miyagi

(10) Patent No.: US 7,484,229 B2
(45) Date of Patent: Jan. 27, 2009

(54) OPTICAL PICKUP AND OPTICAL DISK APPARATUS

(75) Inventor: Takahiro Miyagi, Tokyo (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 10/563,428

(22) PCT Filed: May 19, 2005

(86) PCT No.: PCT/JP2005/009152

§ 371 (c)(1),
(2), (4) Date: Jan. 5, 2006

(87) PCT Pub. No.: WO2005/112013

PCT Pub. Date: Nov. 24, 2005

(65) Prior Publication Data

US 2006/0161939 A1    Jul. 20, 2006

(30) Foreign Application Priority Data

May 19, 2004  (JP) ............................ 2004-148742
Oct. 27, 2004 (JP) ............................ 2004-312103

(51) Int. Cl.
*G11B 7/09* (2006.01)
*G11B 7/135* (2006.01)
*G11B 7/095* (2006.01)

(52) U.S. Cl. ...................... 720/683; 720/681

(58) Field of Classification Search ................. 720/674, 720/675, 676, 681, 682, 683, 691
See application file for complete search history.

(56) References Cited

U.S. PATENT DOCUMENTS

2007/0280090 A1*  12/2007  Miyagi ................... 369/244.1

FOREIGN PATENT DOCUMENTS

| JP | 59-189730 | | 12/1984 |
|---|---|---|---|
| JP | 2-236829 | | 9/1990 |
| JP | 9-35304 | | 2/1997 |
| JP | 11-120587 | | 4/1999 |
| JP | 11312323 A | * | 11/1999 |
| JP | 2002074707 A | * | 3/2002 |
| JP | 2002304756 A | * | 10/2002 |
| JP | 2003-257061 | | 9/2003 |
| JP | 2004-5910 | | 1/2004 |
| JP | 2004-319027 | | 11/2004 |

* cited by examiner

*Primary Examiner*—William J Klimowicz
(74) *Attorney, Agent, or Firm*—Oblon, Spivak, McClelland, Maier & Neustadt, P.C.

(57) ABSTRACT

An optical pick-up adapted to have ability to conduct a control so as to tilt a lens holder (2), including a supporting block (3) for movably supporting the lens holder in the focus direction and in the tracking direction, a supporting member (4) including a pair of leg pieces (41), (41) for supporting and allowing the supporting block to be tilted by fixing front end sides of these leg pieces onto a base (16), the leg pieces being arranged such that spacing between the leg pieces increases as a distance from a side at which the supporting block is supported increases toward the front end side, and a drive mechanism (5) for applying a drive force to the supporting block so as to tilt the supporting block by changing a shape of the pair of leg pieces, whereby tilting the lens holder which is supported by the supporting block.

15 Claims, 10 Drawing Sheets

OPTICAL PICKUP AND OPTICAL DISK APPARATUS

TECHNICAL FIELD

The present invention relates to an optical pick-up used for performing recording of information signals onto an optical disc and for performing reproduction of information signals recorded on an optical disc, and an optical disc apparatus using such an optical pick-up.

BACKGROUND ART

Hitherto, optical discs such as DVD (Digital Versatile Disc), etc. are used as recording media for information signal. In order to perform recording of information signals onto optical discs of this kind, or to perform reproduction of information signals recorded on the optical discs, optical pick-up is used.

Such an optical pick-up comprises an actuator for focus which is adapted for moving an object lens in a focus direction which is an optical axis direction thereof in order to allow light beams emitted from a light source to be in-focus state onto the recording surface of the optical disc, and further comprises an actuator for tracking which is adapted for moving the object lens in a tracking direction at the plane surface direction perpendicular to the optical axis thereof in order to allow light beams to follow recording tracks provided at the optical disc. Namely, the optical pick-up comprises a biaxial actuator for allowing the object lens to undergo drive displacement in biaxial directions perpendicular to each other of the focus direction and the tracking direction.

In recent years, with realization of high recording density of the optical discs, it is required to allow shape of light spot formed on the recording surface of the optical disc to be more precise circular. It is more important to conduct a control such that the optical axis of the object lens is perpendicular to the recording surface of the optical disc. For this reason, there is proposed an optical pick-up comprising a triaxial actuator in which an actuator dedicated for tilt angle control for tilting the optical axis of the object lens in a manner following inclination of the optical disc is added to a biaxial actuator for focus and tracking.

As an optical pick-up comprising such triaxial actuator, there is an optical pick-up adapted for supporting a lens holder which has supported an object lens by a shaft to rotate the lens holder with the support shaft being as fulcrum to thereby adjust inclination (tilt) with respect to the optical disc of the object lens. For example, there is an optical pick-up described in the Japanese Patent Application Laid Open No. 1997-44879 publication.

This optical pick-up serves to rotate the lens holder by drive force based on magnetic interaction between drive current delivered to coil provided on the peripheral surface of the lens holder and magnetic flux produced from magnet provided in a manner opposite to the coil to thereby tilt the object lens supported by the lens holder to perform control of tilt angle.

Meanwhile, in the optical pick-up adapted for rotating the lens holder by supporting mechanism using the shaft, the lens holder becomes difficult to undergo rotation displacement in a manner following a drive force by hysteresis based on sliding friction produced between the shaft and bearing for supporting such shaft. As a result, it becomes impossible to perform control of tilt angle of the object lens corresponding to drive current delivered to the coil in accordance with a control signal.

DISCLOSURE OF THE INVENTION

Problems to be Solved by the Invention

An object of the present invention is to provide an optical pick-up which solves problems that conventionally proposed optical pick-up devices as described above have, prevents deterioration of the focus control characteristic and the tracking control characteristic, and is ability to perform control of tilt angle of the object lens by simple configuration, and an optical disc apparatus using such an optical pick-up.

The optical pick-up to which the present invention is applied is directed to an optical pick-up which is permitted to perform a control so as to tilt a lens holder to which an object lens is attached to allow the optical axis of the object lens to be perpendicular to the signal recording surface of an optical disc, the optical pick-up comprising: the lens holder to which the object lens is attached, and to be moved in a focus direction in parallel to an optical axis of the object lens and in a tracking direction perpendicular to the optical axis direction of the object lens; a supporting block for movably supporting the lens holder in the focus direction and in the tracking direction; a supporting member including a pair of leg pieces for supporting and allowing the supporting block to be tilted by fixing front end sides of the leg pieces onto a base, the leg pieces being arranged such that spacing between the leg pieces increases as a distance from a side at which the supporting block is supported increases toward the front end side; and a drive mechanism for applying a drive force to the supporting block so as to tilt the supporting block by changing a shape of the leg pieces, whereby tilting the lens holder which is supported by the supporting block.

Moreover, the optical disc apparatus according to the present invention includes a drive mechanism for rotationally driving an optical disc in the state where the optical disc is held, and an optical pick-up for irradiating light beams serving to perform recording or reproduction of information signals on and from the optical disc rotationally driven by the drive mechanism, and for detecting reflected light beams reflected from the optical disc, wherein there is used, as the optical pick-up, an optical pick-up adapted to have ability to conduct a control so as to tilt a lens holder to which an object lens is attached to allow an optical axis of the object lens to be perpendicular to the signal recording surface of the optical disc, the optical pick-up comprising: the lens holder to which the object lens is attached, and to be moved in a focus direction in parallel to the optical axis of the object lens and in a tracking direction perpendicular to the optical axis direction of the object lens, a supporting block for movably supporting the lens holder in the focus direction and in the tracking direction, a supporting member including a pair of leg pieces for supporting and allowing the supporting block to be tilted by fixing front end sides of the leg pieces onto a base, the leg pieces being arranged such that spacing between the leg pieces increases as a distance from a side at which the supporting block is supported increases toward the front end side, and a drive mechanism for applying a drive force to the supporting block so as to tilt the supporting block by changing a shape of the pair of leg pieces, whereby tilting the lens holder which is supported by the supporting block.

In the optical pick-up according to the present invention, when drive force is applied from the drive mechanism with respect to the supporting block, shape of a pair of leg pieces of the supporting member is changed to tilt the supporting block so that the lens holder is caused to undergo displacement. Thus, it is possible to tilt the object lens.

Accordingly, it is possible to tilt the object lens in accordance with warp, etc. of the optical disc. In addition, since the supporting block supported by the supporting member is driven by the supporting block, it is possible to add the configuration adapted for tilting the object lens in accordance with warp, etc. of the optical disc without changing the configuration of the lens holder.

Still further objects of the present invention and practical merits obtained by the present invention will become more apparent from the embodiments which will be explained below with reference to the attached drawings.

BEST MODE FOR CARRYING OUT THE INVENTION

Initially, embodiments of an optical pick-up according to the present invention and an optical disc apparatus using such an optical pick-up will be explained with reference to the attached drawings.

Figure 1:
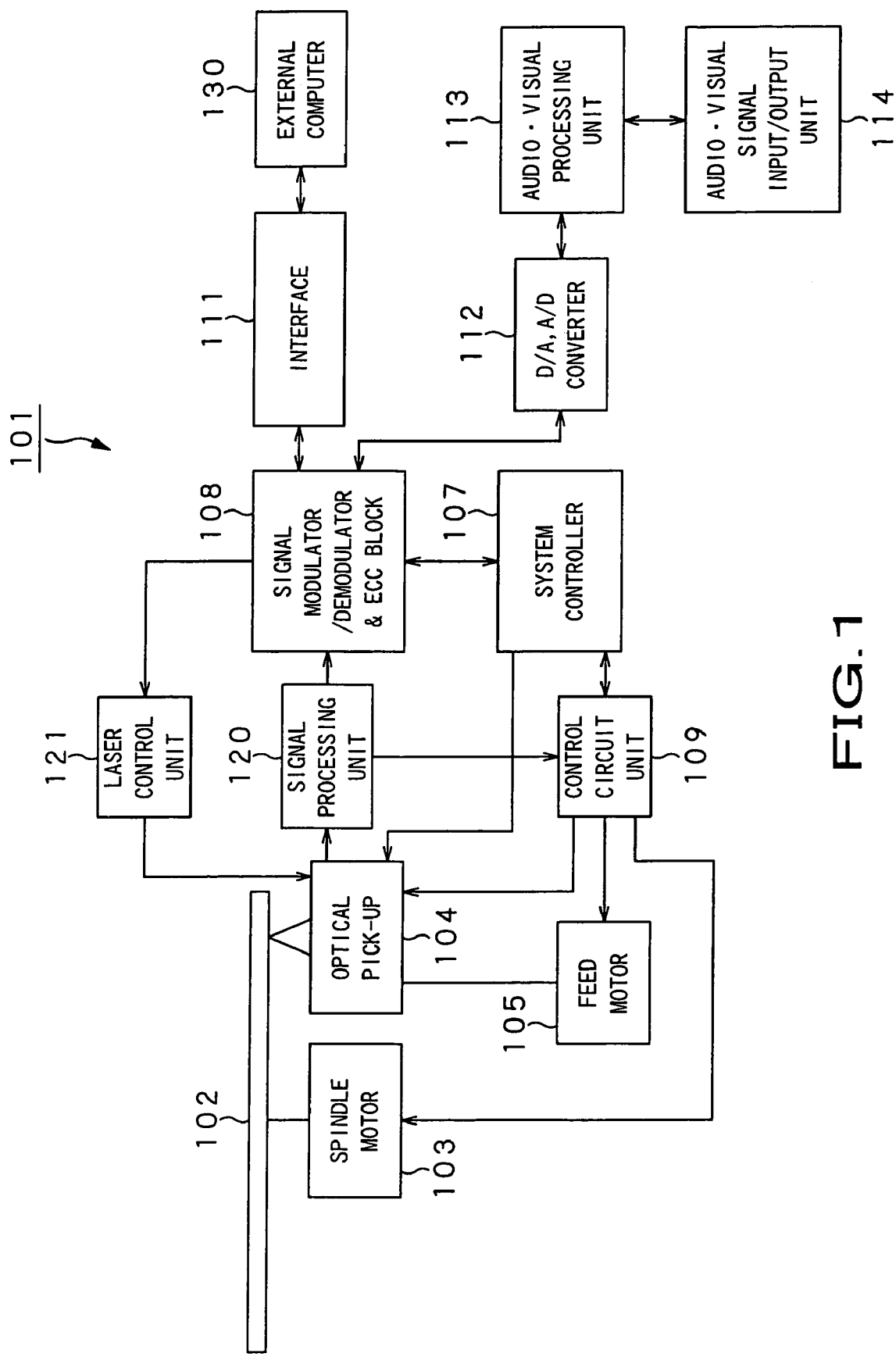
FIG. 1 is a block circuit diagram of an optical disk apparatus using an optical pick-up to which the present invention is applied.

The optical disc apparatus 101 to which the present invention is applied comprises, as shown in FIG. 1, a spindle motor 103 serving as drive means for rotationally driving an optical disc 102 as an optical recording medium such as CD-R, DVD±R, DVD-RAM, etc., an optical pick-up 104, and a feed motor 105 serving as drive means for moving the optical pick-up 104 in the radial direction thereof. In this example, the spindle motor 103 is controlled so that it is driven at a predetermined number of rotations by a system controller 107 and a control circuit unit 109.

A signal modulating/demodulating unit (modulator/demodulator) & ECC block 108 performs modulation/demodulation of signals outputted from a signal processing unit 120 and addition of ECC (Error Correction Code). The optical pick-up 104 serves to irradiate light beams onto the signal recording surface of the rotating optical disc 102 in accordance with instructions from the system controller 107 and the control circuit unit 109. By such irradiation of light beams, recording of information signals with respect to the optical disc 102 is performed, and reproduction of information signals recorded on the optical disc is performed.

Moreover, the optical pick-up 104 is caused to be of the configuration to detect various light beams as described later on the basis of reflected light beams reflected from the signal recording surface of the optical disc 102 to deliver detection signals obtained from respective light beams to the signal processing unit 120.

The signal processing unit 120 serves to generate various servo signals, i.e., a focus error signal and a tracking error signal on the basis of a detection signal obtained by detecting respective light beams, and to generate a RF signal which is information signal recorded on the optical disc. Moreover, predetermined processing such as modulation/demodulation & error correction processing based on these signals, etc. are performed by the control circuit unit 109 and/or the signal modulating/demodulating unit (modulator/demodulator) & ECC block 108 in accordance with kind of recording media to be reproduced.

Here, if recording signals which have been demodulated by the signal modulating unit/demodulating unit & ECC block 108 are, e.g., recording signals for data storage of computer, those recording signals are sent out to an external computer 130, etc. through an interface 111. Thus, the external computer 130, etc. is caused to be of the configuration capable of receiving signals recorded on the optical disc 102 as a reproduction signal.

Moreover, if recording signals which have been demodulated by the signal modulating/demodulating unit and ECC block 108 are recording signals for audio-visual system, the recording signals are caused to undergo digital/analog conversion at the D/A converting unit of the D/A, A/D converter 112. The recording signals thus processed are delivered to an audio-visual processing unit 113. Further, audio-video (visual) signal processing is performed at the audio-visual signal input/processing unit 113. The audio-visual signals thus obtained are transmitted to external image pick-up-projection equipment through an audio-visual signal input/output unit 114.

A feed motor 105 is connected to the optical pick-up 104. The optical pick-up 104 is caused to undergo feed operation in the radial direction of the optical disc 102 by rotation of the feed motor 105, and is moved up to a predetermined recording track on the optical disc 102. The control of the spindle motor 103, the control of the feed motor 105, and the control for actuator which is adapted for allowing the object lens of the optical pick-up 104 to undergo movement displacement in the focus direction of the optical axis direction thereof and in the tracking direction perpendicular to the optical axis direction are respectively performed by the control circuit unit 109.

Namely, the control circuit unit 109 performs control of the spindle motor 103 to perform control of the actuator on the basis of a focus error signal and a tracking error signal.

Further, the control circuit unit 109 is caused to be of the configuration to respectively generate, on the basis of focus error signal, tracking error signal and RF signal, etc. which are inputted from the signal processing unit 120, drive signals (drive currents) delivered to focus coil 10 which will be described later (see FIG. 2) and a pair of tracking coils 11 (see FIG. 2) respectively provided at both sides of tangential direction Tz.

In addition, a laser control unit 121 serves to control laser light source at the optical pick-up 104.

It is to be noted that, here, the focus direction F refers to optical axis direction of the object lens 7 (see FIG. 2) of the optical pick-up 104, the tangential direction Tz refers to direction perpendicular to the focus direction F and direction in parallel to the tangential direction of circumference of the optical disc apparatus 101, and the tracking direction T refers to the direction perpendicular to the focus direction F and the tangential direction Tz. Moreover, an angle of difference in which an angle that the optical axis of the object lens 7 and virtual line passing through the optical axis and extending in the radial direction of the optical disc 102 form deviates with respect to 90 degrees refers to tilt angle in the radial direction.

Further, at the optical disc apparatus 101, there is provided a tilt detection sensor 21 for detecting tilt (inclination) of the optical disc 102 loaded to the spindle motor 103. A detection signal detected by the tilt detection sensor 21 is delivered to the control circuit unit 109. The control circuit unit 109 outputs a tilt angle control signal on the basis of a tilt detection signal to deliver the tilt angle control signal thus obtained to drive mechanism 5 which will be described later. The drive mechanism 5 serves to allow the object lens 7 to undergo drive displacement by drive current corresponding to the tilt angle control signal to perform adjustment of tilt angle.

Then, the optical pick-up 104 to which the present invention is applied will be described in detail.

Figure 2:
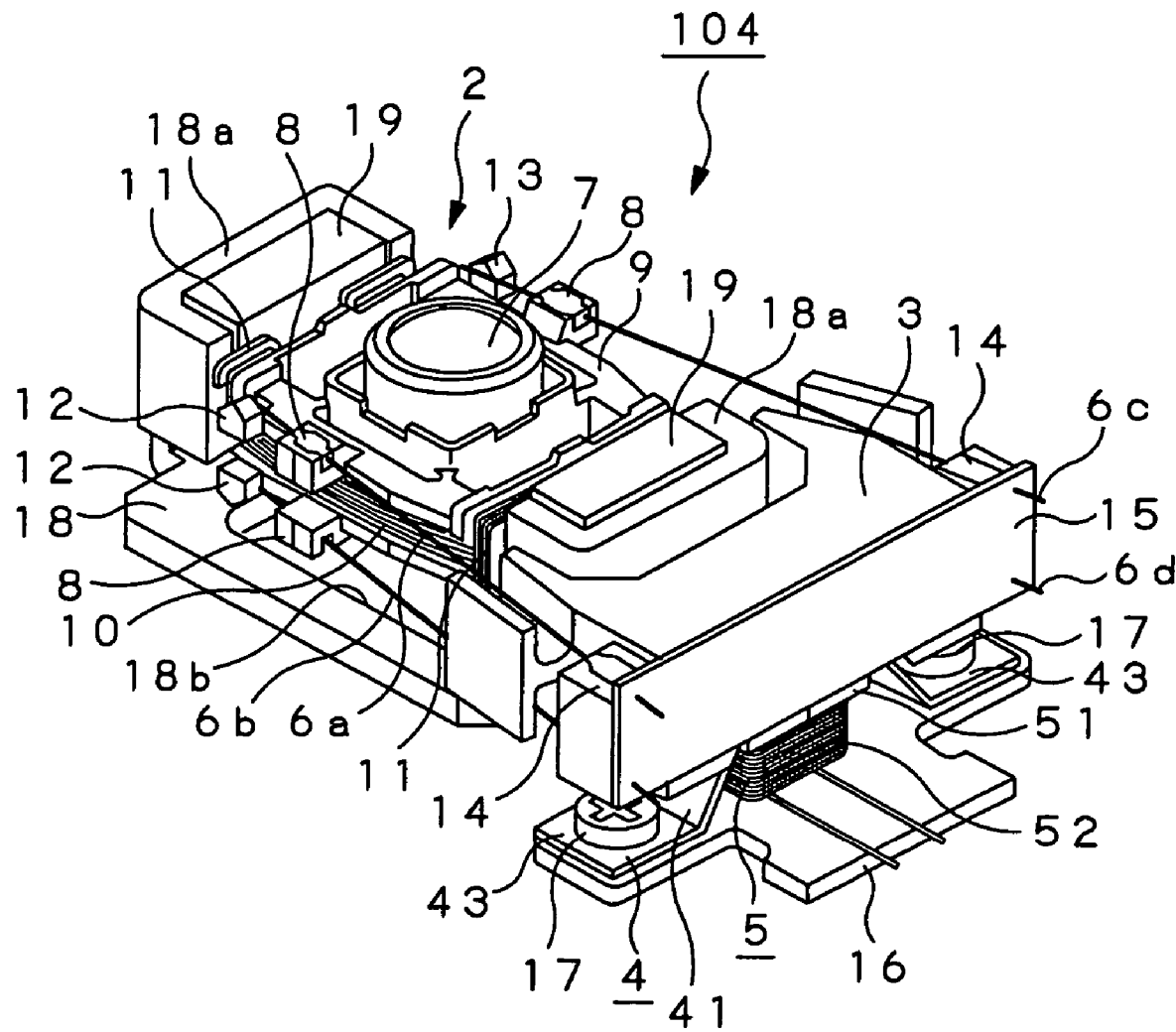
FIG. 2 is a perspective view showing a first embodiment of the optical pick-up according to the present invention.
Figure 2:
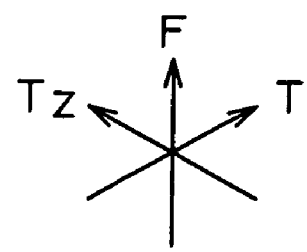
Figure 3:
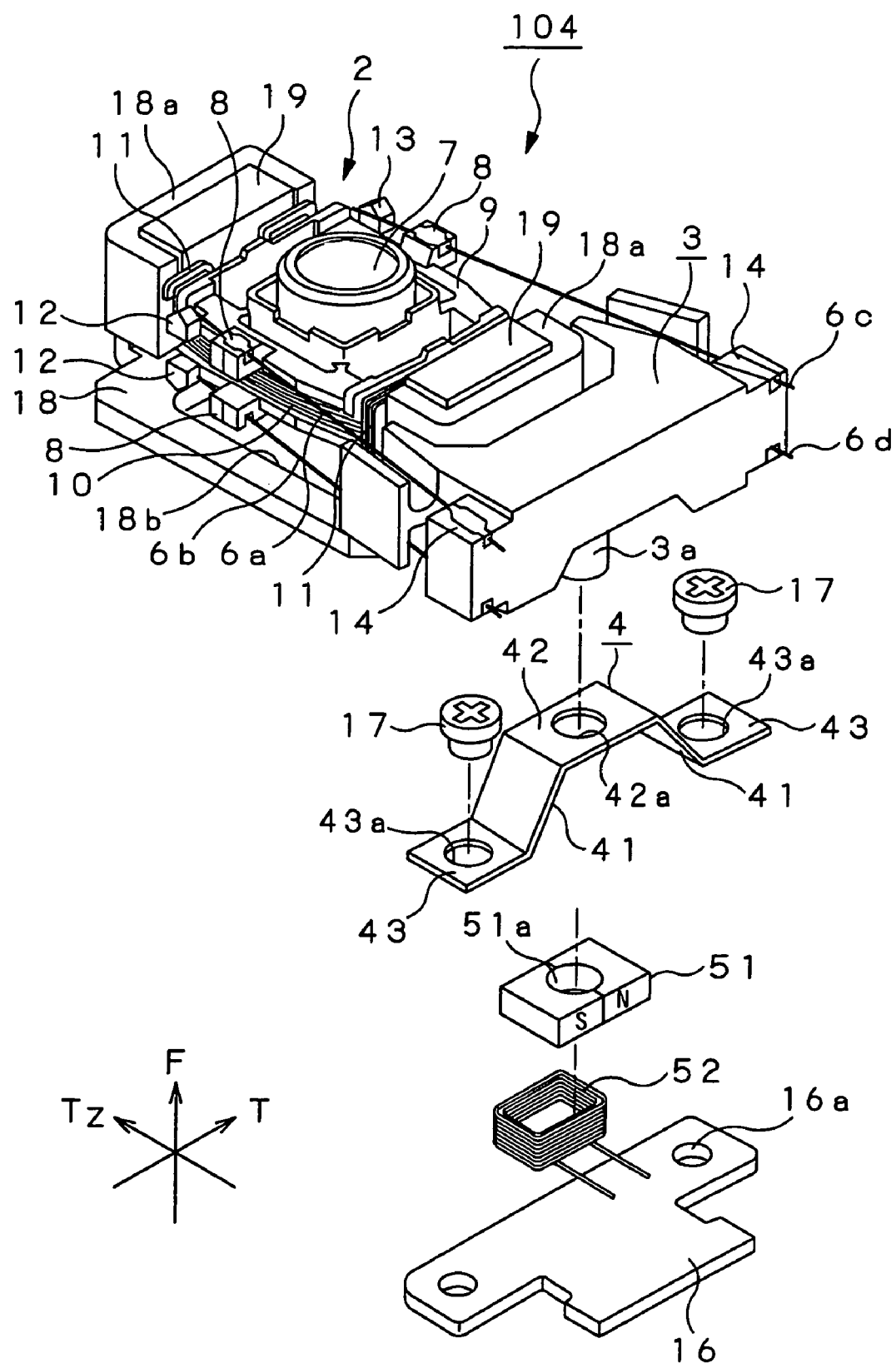
FIG. 3 is an exploded perspective view of the optical pick-up shown in FIG. 2.
Figure 4:
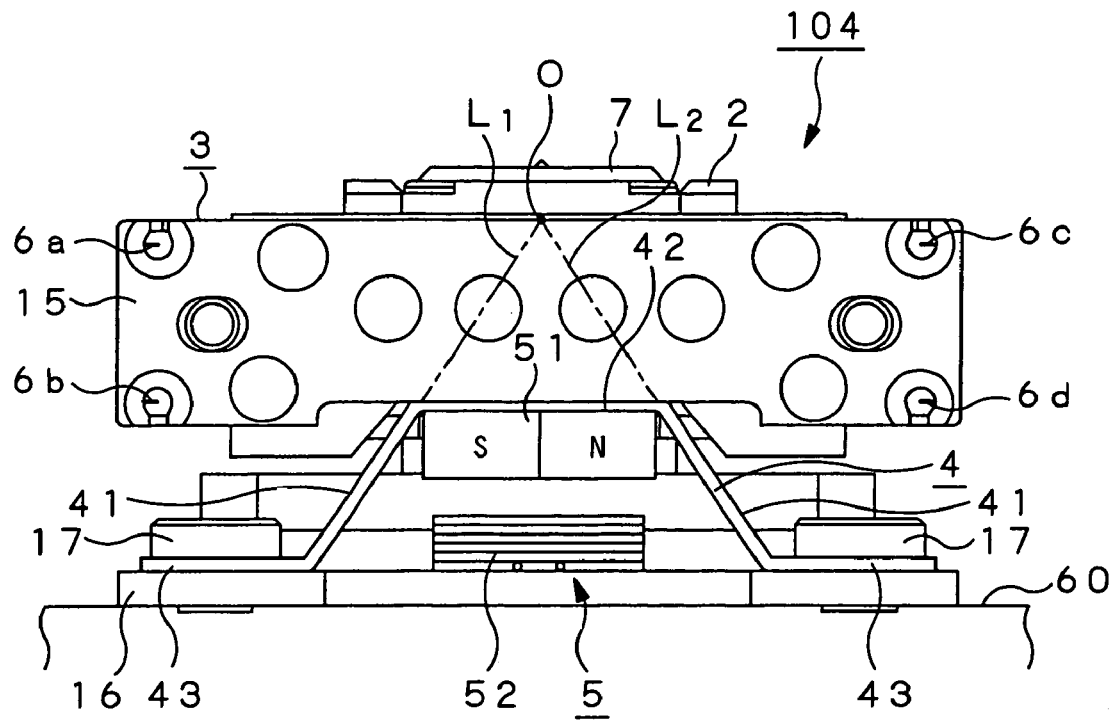
FIG. 4 is a back (rear) view of the optical pick-up shown in FIG. 2.

FIG. 2 is a perspective view showing a first embodiment of the optical pick-up to which the present invention is applied, FIG. 3 is an exploded perspective view thereof, and FIG. 4 is a back view of the optical pick-up shown in FIG. 2.

The optical pick-up 104 to which the present invention is applied includes a semiconductor laser serving as light source for emitting light beams, a photo-diode serving as a light detection element for detecting reflected light beams reflected from the signal recording surface of the optical disc 102, and an optical system for guiding light beams from the semiconductor laser to the optical disc 102 and for guiding reflected light beams to the light detection element.

As shown in FIGS. 2 and 4, the optical pick-up 104 is provided on an attachment base 60 provided so that it can be moved in the radial direction of the optical disc 102 within the casing of the optical disc apparatus 101.

The optical pick-up 104 comprises a lens holder 2 for supporting the object lens 7 serving to converge light beams emitted from light source to irradiate the light beams thus converged onto the optical disc, and a supporting block 3 arranged at an interval in the tracking direction from the lens holder 2 and attached to an attachment base 60, and the object lens 7 constitutes a portion of the optical system of the optical pick-up 104.

As shown in FIGS. 2 and 3, the lens holder 2 is provided in a manner to surround the outer circumferential surface side of the object lens 7, and serves to support the object lens 7 at the central portion thereof.

The focus coil 10 is wound at the outer circumferential surface of the lens holder 2, and the tracking coils 11 are attached at the side surfaces opposite to each other in the tangential direction Tz perpendicular to the tracking coil of the lens holder 2. The tracking coils 11 are provided by one pair at respective side surfaces of the lens holder 2.

At both sides in the tracking direction of the lens holder 2, arm supporting portions 8 are respectively provided by one pair at an interval in the focus direction.

As shown in FIGS. 2 and 3, the supporting block 3 has length along the tracking direction, and height along the focus direction.

At both sides of the supporting block 3 along the tracking direction, there are respectively provided a pair of arm supporting portions 14 at an interval in the focus direction. At the back (rear) face side of the supporting block, there is provided a printed wiring board 15. A drive current for focus and a drive current for tracking are delivered from the control circuit unit 109 to the printed wiring board 15.

Further, respective pair of arm supporting portions 8 at both sides in the tracking direction of the lens holder 2 and respective pair of arm supporting portions 14 at both sides in the tracking direction of the supporting block 3 are respectively by respective one pairs of supporting arms 6a, 6b and respective the other pairs of supporting arms 6c, 6d. The respective one and the other supporting arms 6a, 6b and 6c, 6d are provided in parallel to each other at intervals in the focus direction as shown in FIG. 2, and support the lens holder 2 with respect to the supporting block 3 so that it can be moved in the focus direction F and in the tracking direction T. These respective supporting arms 6a, 6b, 6c, 6d are constituted by linear member having conductivity and having elasticity.

End portions of the lens holder 2 side of the pair of supporting arms 6a, 6b disposed at one side of the supporting block 3 are connected to connection terminals 12, 12 provided at the focus coil 10 by soldering, etc., and the end portion of the supporting block 3 side is connected to conductive pattern provided on the printed wiring board 15. Thus, a drive current for focus from the control circuit unit 109 is delivered to the focus coil 10 through supporting arms 6a, 6b. Similarly, end portions of the lens holder 2 side of the supporting arms 6c, 6d disposed at the other side of the supporting block 3 are connected to a connection terminal 13 provided at the tracking coils 11 by soldering, etc., and the end portion of the supporting block 3 side is connected to conductive patterns provided at the printed wiring board 15. Thus, a drive current for tracking from the control circuit unit 109 is delivered to the tracking coil 11 through the supporting arms 6c, 6d.

Further, as shown in FIGS. 2 and 4, a yoke 18 is disposed between the lens holder 2 and the attachment base 60. Substantially at the central portion of the yoke 18, as shown in FIGS. 2 and 3, there is provided an opening portion 18b for allowing light beams incident on the object lens 7 to be transmitted therethrough.

At both sides of tangential direction Tz of the yoke 18, as shown in FIGS. 2 and 3, a pair of yoke pieces 18a, 18a are formed in a rising manner so that they are opposite to each other with the object lens 7 being put therebetween. At surfaces opposite to each other of the respective yoke pieces 18a, 18a, there are attached magnets 19, 19. These respective magnets 19, 19 are opposed to the focus coil 10 wound on the outer circumferential surface of the lens holder 2 and the tracking coils 11 respectively attached at side surfaces opposite to each other of the lens holder 2.

As stated above, the magnets 19 are opposed to the focus coil 10 and the tracking coils 11. Thus, when drive current for focus is delivered to the focus coil 10, the lens holder 2 is caused to undergo drive displacement in the focus direction by interaction between drive current delivered to the focus coil 10 and magnetic field from respective magnets 19. Thus, when drive current for tracking is delivered to the tracking coil 11, the lens holder 2 is caused to undergo drive displacement in the tracking direction by interaction between drive current delivered to the tracking coil 11 and magnetic field from respective magnets 19. As a result, the object lens 7 supported by the lens holder 2 is caused to undergo drive displacement in the focus direction F or in the tracking direction T. Thus, focus control conducted such that light beams irradiated onto the optical disc 102 through the object lens 7 are caused to be in-focus state onto the signal recording surface of the optical unit 102 is performed, and tracking control conducted such that light beams follow recording tracks formed at the optical disc 102 is performed.

Further, the optical pick-up 104 according to the present invention comprises supporting member 4 for supporting the supporting block 3 which has supported the lens holder 2 through left and right respective pairs of supporting arms 6a to 6d so that it can be tilted, and drive mechanism 5 for tilting the supporting block 3 in accordance with inclination (tilt) of the optical disc 102.

In this embodiment, as shown in FIG. 3, the supporting member 4 is formed by bending belt-shaped leaf spring material, and comprises a supporting block attachment piece 42 fixed to the supporting block 3, and a pair of leg pieces 41, 41 extended from both ends of the supporting block attachment piece 42. From the front end portions of these leg pieces 41, 41, there are provided base attachment pieces 43, 43 for attaching the supporting member 4 onto the base 16. At the center of the supporting block attachment piece 42, there is provided a penetration hole 42a.

The drive mechanism 5 for driving the supporting block 3 is composed of a double-pole magnetized magnet 51 attached on the lower surface of the supporting block 3, and a voice coil 52 attached to the base 16 in a manner opposite to the double-pole magnetized magnet 51. The double-pole magnetized magnet 51 has rod shape, wherein a penetration hole 51a is provided at the central portion thereof.

The supporting block 3 is mounted on a supporting block attachment piece 42 in the state where an engagement projecting portion 3a projected toward the lower surface is penetrated into the penetration hole 42a and is fitted into the penetration hole 51a of the double-pole magnetized magnet 51 so that it is mounted on a supporting block attachment piece 42. Further, the supporting member 4 is integrated with the supporting block 3 by connecting the supporting block attachment piece 42 onto the lower surface side of the supporting block 3. Moreover, the magnet 51 is integrated with the supporting block 3 resulting from the fact that it is fixed into fitting projecting portion 3a fitted into the penetration hole 51a by using adhesive agent.

At this time, as shown in FIG. 3, the double-pole magnetized magnet 51 is fixed so that N-poles and S-poles are arranged with the tangential direction Tz vertical to the tracking direction T perpendicular to the focus direction F in parallel to the optical axis of the object lens 7 being as polarization line. Moreover, the supporting member 4 is adapted so that bent portions caused to serve as connecting portions of respective leg pieces 41, 41 and the supporting block attachment piece 42 and bent portions caused to serve as connecting portion of respective leg pieces 41, 41 and base attachment pieces 43, 43 are fixed in a manner in parallel to the tangential direction Tz. Further, the supporting member 4 is fixed so that no play is produced with respect to the supporting block 3.

Further, penetration holes 43a, 43a are respectively provided at base attachment pieces 43, 43 of the supporting member 4, and screw holes 16a, 16a into which fixed screws 17, 17 to be inserted into the respective penetration holes 43a, 43a are screw-fitted are provided at the base 16. The supporting member 4 is fixed on the base 16 by inserting fixed screws 17, 17 into respective penetration holes 43a, 43a of the base attachment pieces 43, 43 to screw-fit these screws 17, 17 into the screw holes 16a, 16a. Thus, the supporting block 3 is supported on the base 16 through a pair of leg pieces 41, 41 of the supporting member 4.

Meanwhile, a pair of leg pieces 41, 41 constituting the supporting member 4 are provided in non-parallel in the inclined state so that spacing becomes broad from the supporting block attachment piece 42 side toward base attachment pieces 43, 43 side. Further, the pair of leg pieces 41, 41 inclined to each other are formed so that the height of center of gravity of the object lens 7 substantially becomes in correspondence with the same height as the cross point O of virtual lines L1, L2 extended toward the supporting block 3 side supported on the supporting block attachment piece 42. Accordingly, the supporting member 4 is formed so as to have trapezoidal shape on the whole.

Moreover, the voice coil 52 is fixed on the base 16 in such a manner opposite to the double-pole magnetized magnet 51 between these pair of leg pieces 41, 41.

Further, when drive current is delivered to the voice coil 52, there is produced a force for moving the double-pole magnetized magnet 51, i.e., a force for driving the supporting block 3 with respect to the voice coil 52 by action of current flowing in the voice coil 52 and magnetic field of the double-pole magnetized magnet 51. Since the supporting block 3 is supported by supporting member 4 formed by leaf spring, and including a pair of non-parallel leg pieces 41, 41 so that it takes trapezoidal shape on the whole, the attitude thereof is changed following the shape of the supporting member 4 when drive force is received.

Meanwhile, the supporting member 4 has a predetermined width so as to have rigidity with respect to torsion. Further, in the supporting member 4, as the result of the fact that the supporting block attachment piece 42 is fixed on the supporting block 3, and the attachment piece 43 is fixed on the base 16, respective leg pieces 41, 41 can be caused to undergo elastic displacement so as to form arcuate shape when drive force is received (applied). In addition, the bent portion serving as connecting portions between leg pieces 41, 41 and the supporting block attachment piece 42 and the bent portion serving as connecting portions between the leg pieces 41, 41 and base attachment pieces 43, 43 can be also caused to undergo elastic displacement.

Then, the operation of the optical pick-up 104 comprising the drive mechanism 5 for driving supporting block 3 as described above will be explained.

At the optical pick-up 104, in the state where power is not fed to the voice coil 52 of the drive mechanism 5, the supporting member 4 is placed in neutral state without being deformed as shown in FIG. 4. At this time, the shape, etc. of the supporting member 4 is set so that the object lens 7 supported by the leans holder 2 becomes horizontal.

Figure 5:
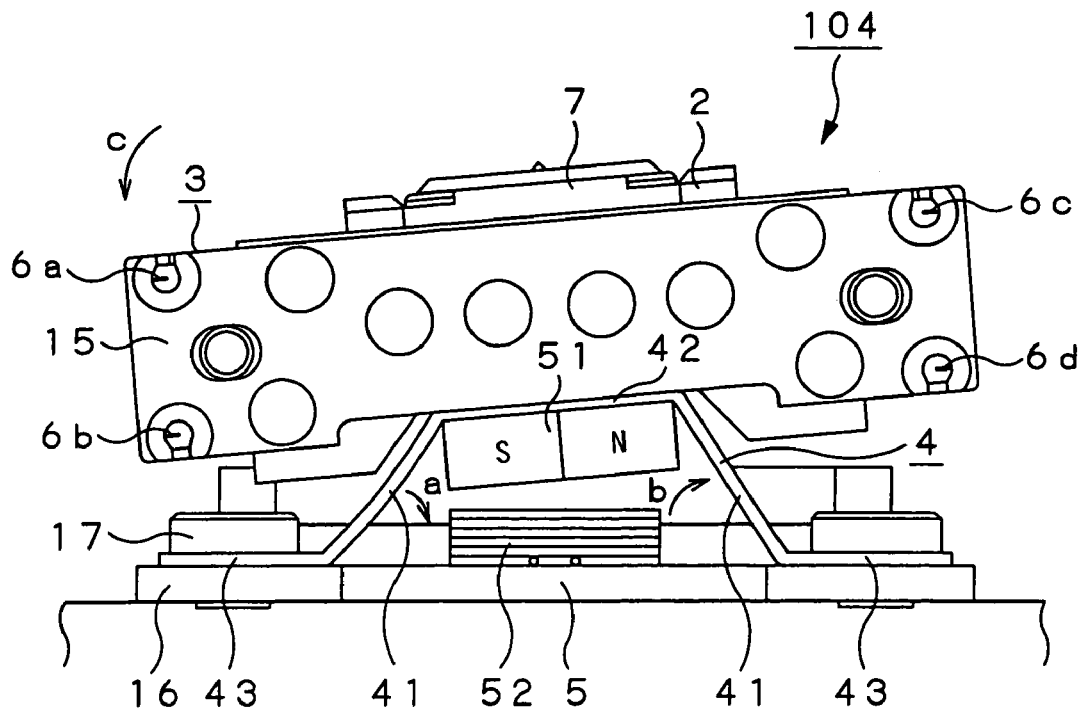
FIG. 5 is a back view showing the state where supporting member is caused to undergo displacement so that supporting block is tilted.

When drive current is delivered to the voice coil 52 in the state shown in FIG. 4, there is produced a force serving to drive the supporting block 3 substantially in horizontal direction along the extending direction of the double-pole magnetized magnet 51 as the result of the fact that current is caused to flow in the coil within magnetic field of the double-pole magnetized magnet 51. Since the supporting block 3 is supported by trapezoidal supporting member 4 including non-parallel pair of leg pieces 41, 41, the attitude of the supporting block 3 is controlled in a manner following shape of the supporting member 4 when drive force is received. Namely, when a force for driving the supporting block 3 substantially in horizontal direction is applied, one leg piece 41 of the supporting member 4 is elastically deformed in a direction indicated by arrow a in which angle with respect to the plane surface of the base 16 becomes smaller, and the other leg piece 41 is elastically deformed in a direction indicated by arrow b in which angle with respect to the plane surface of the base 16 becomes large as shown in FIG. 5. Thus, the supporting block 3 is tilted in the direction indicated by arrow c in FIG. 5. At this time, the supporting block 3 rotates with cross point O on extending line of a pair of leg pieces 41, 41 placed in the neutral state shown in FIG. 4 being as center.

In the supporting block 3, since the lens holder 2 is supported by four supporting arms 6a to 6d, the lens holder 2 is tilted as the result of the fact that the supporting block 3 is tilted. Thus, a drive current corresponding to a predetermined control signal is delivered to the voice coil 52, thereby making it possible to perform control of tilt angle for tilting the optical axis of the object lens 7 supported by the lens holder 2 in correspondence with warp, etc. of the optical disc. The direction of inclination (tilt) of the supporting block 3 is switched depending upon direction of a drive current delivered to the voice coil 52. Moreover, angle of inclination (tilt) of the supporting block 3 can be adjusted by a drive current/voltage value delivered to the voice coil 52 so that it takes a predetermined angle.

As described above, at the pair of leg pieces 41, 41 tilted to each other which constitute the supporting member 4, since the height of center of gravity of the object lens 7 is caused to be substantially in correspondence with the same height as the cross point O of virtual lines L1, L2 extended toward the supporting block 3 side supported on the supporting block attachment piece 42, the lens holder 2 perform rotation with the axis passing through the center of gravity of the object lens 7 being as center. Thus, the optical axis in the state where the object lens 7 is in horizontal state and the optical axis in the state where the object lens 7 is in tilted state are substantially in correspondence with each other.

As stated above, the supporting block 3 is supported by using the supporting member 4 formed by using leaf spring and comprising a pair of tilted leg pieces 41, 41 to rotate the supporting block 3 by elastic deformation of the supporting member 4. As a result, as compared to the conventional optical pick-up in which lens holder is axially supported to perform rotation, it is possible to eliminate the influence of hysteresis by sliding friction, etc.

It is to be noted that, in the above-described configuration using the supporting member 4, the supporting block 3 does not perform rotational operation precisely with one point being as center. For this reason, when the supporting block 3 is tilted to rotate the lens holder 2, the object lens 7 is moved by very small quantity both in the focus direction and in the tracking direction. For this reason, as occasion demands, focus correction and/or tracking correction are performed. Moreover, very small movement quantity with respect to the optical axis of the object lens 7 by inclination of the supporting block 3 including the lens holder 2 may be measured in advance to perform focus correction and tracking correction in accordance with inclination quantity of the supporting block.

Then, the control system for tilting the supporting block 3 which has supported the lens holder 2 will be explained with reference to FIG. 6.

Figure 6:
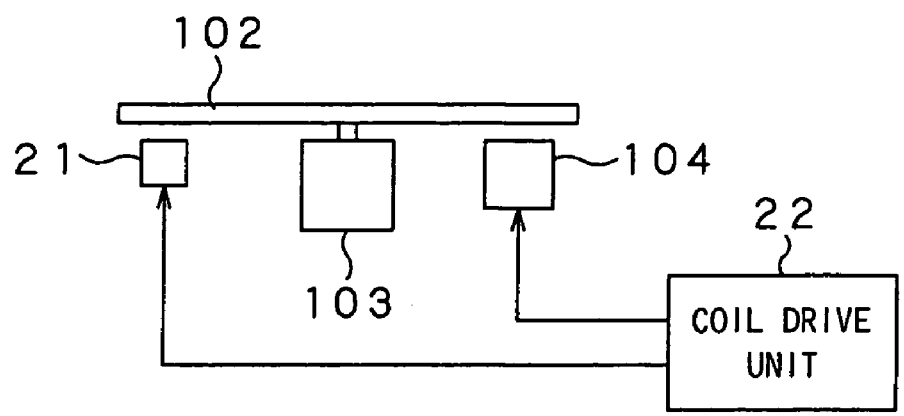
FIG. 6 is a block circuit diagram showing control system for tilting the supporting block of the optical pick-up shown in FIG. 2.

FIG. 6 is a block diagram showing the control system of the optical pick-up 104 of this embodiment. The control system for the optical pick-up 104 comprises a tilt detection sensor 21 as a detector for detecting inclination of, e.g., the optical disc 10 in order to obtain a control signal delivered to the voice coil 52 shown in FIGS. 2 and 3. Further, a coil drive circuit 22 serves to apply a control signal to the voice coil 52 in accordance with output of the tilt detection sensor 21 to rotate the lens holder 2 in correspondence with inclination of the disc surface by warp, etc. of the optical disc 102. It is to be noted that this operation is performed when the optical disc 102 is first loaded to a spindle motor 103 to maintain corrected inclination during reproducing operation, etc.

Further, since inclination of the optical disc appears as noise at output of light detector (not shown), the optical pick-up 104 may be caused to have such a control function to control the drive mechanism 5 so as to tilt the lens holder 2 in a direction where these results less noise of output of the light detector without using tilt detection sensor.

When there is employed, as stated above, a configuration in which drive mechanism 5 for driving the supporting block 3 is provided to tilt the lens holder 2, means for detecting inclination of the optical disc is provided to thereby tilt the object lens 7 by quantities corresponding to warps, etc. of individual optical discs, to have ability to make correction so that the optical axis of the object lens 7 is perpendicular to the surface of the optical disc. Thus, shape of light spot formed as the result of the fact that light beams are converged onto the signal recording surface of the optical disc is permitted to be reasonable at all times. In addition, work for adjusting inclination of the lens holder 2 by human hand also becomes unnecessary.

Then, the focus control and the tracking control of the lens holder 2 will be explained. When a drive current corresponding to focus control signal generated from a reproduction signal is delivered to the focus coil 10, there is produced a force in a direction to rise or fall the lens holder 2 in parallel to the optical axis direction of the object lens 7 in accordance with direction of the drive current by a force produced by action of current flowing in the focus coil 10 and magnetic field formed by the yoke 18, the yoke pieces 18a, 18a and magnets 19, 19 supported by these yoke pieces 18a, 18a. Since the lens holder 2 is supported at one end portions of four supporting arms 6a to 6d, when the lens holder 2 undergoes a force in rising or falling direction, it is vertically moved while maintaining attitude in parallel to the optical disc 102 rotated by the spindle motor 103. Thus, the object lens 7 is caused to undergo focus control in a direction along the optical axis. As a result, light spot from the object lens 7 is caused to be in-focus state on tracks of the optical disc.

Further, when a drive current corresponding to a tracking control signal generated from a reproduction signal is delivered to the tracking coil 11, there is produced a force to move the lens holder 2 in inner circumferential direction of the optical disc 102 which is rotated by the spindle motor 103, or in outer circumferential direction of the optical disc 102 similarly rotated in accordance with a force produced by action of current flowing in the coil and magnetic field formed by the yoke 18, the yoke pieces 18a, 18a and magnets 19, 19 supported by these yoke pieces 18a, 18a. Since the lens holder 2 is supported at one end portion of four supporting arms 6a to 6d, when the lens holder 2 undergoes a force in a direction to move in a direction in parallel to the plane surface of the optical disc 102, it is caused to undergo movement displacement in a direction substantially in parallel to normal direction of recording tracks formed at the optical disc 102. Thus, tracking control such that the object lens 7 is caused to undergo movement control in the radial direction of the optical disc 102 is performed. As a result, light beams emitted from the object lens 7 can trace desired recording tracks.

It is to be noted that while reactive force by the focus control and the tracking control is transmitted to the supporting block 3 through supporting arms 6a to 6d, the supporting member 4 is formed so that it is not deformed by a force for moving the lens holder 2.

Figure 7:
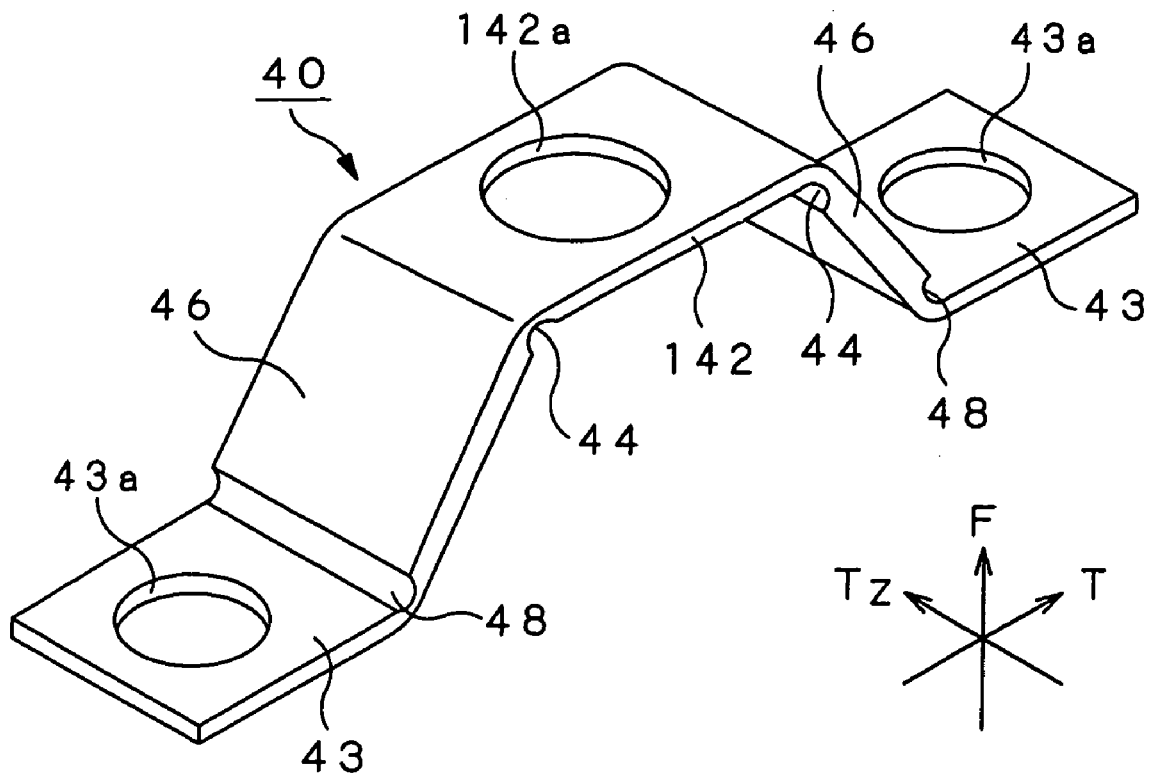
FIG. 7 is a perspective view showing another example of the supporting member constituting supporting mechanism.

While supporting member 4 formed by bending or folding belt-shaped leaf spring material is used as the supporting member 4 for supporting the supporting block 3 so that it can be inclined in the above-described first embodiment, a supporting member 4 constituted as shown in FIG. 7 may be also employed without being limited to such example. As shown in FIG. 7, the supporting member 40 is formed by injection-molding synthetic resin such as polyester resin, etc., and comprises, similarly to the supporting member 4 of the first embodiment, a supporting block attachment piece 142 fixed on the supporting block 3, and a pair of leg pieces 46, 46 extended from both ends of the supporting block attachment piece 142. From front end portions of these leg pieces 46, 46, there are provided base attachment pieces 43, 43 for attaching the supporting member 4 onto the base 16. At the center of the supporting block attachment piece 142, there is provided a penetration hole 142a.

At the supporting member 40, the supporting block attachment piece 142, the pair of leg pieces 46, 46 and the base attachment pieces 43, 43 are formed with rigidity so that it is not caused to easily undergo elastic deformation. In this example, the supporting member 40 is formed so as to have a predetermined thickness and is formed so as to have a rigidity to such a degree that it cannot be easily deformed.

Further, at the connecting portions where the supporting block attachment piece 142 and leg pieces 46, 46 are connected, there are formed elastic displacement portions 44, 44 in such a manner to thin thickness of the connecting portion. Similarly, at connecting portions where respective leg pieces 46, 46 and respective base attachment pieces 43, 43 are connected, elastic displacement portions 48, 48 are formed in such a manner to thin the thickness of the connecting portions.

Also at the supporting member 40 shown in FIG. 7, a penetration hole 142a into which a fitting projection 3a projected toward the lower surface of the supporting block 3 is inserted is provided at the center of the supporting block attachment piece 142, and penetration holes 43a, 43a into which fixing screws 17, 17 for fixing the supporting member 4 onto the base 16 are inserted are provided at respective base attachment pieces 43, 43.

Also at the supporting member 40, fitting projection 3a disposed at the lower surface side of the supporting block 3 and projected toward the lower surface of the supporting block 3 is inserted into the penetration hole 142a and is fitted into a penetration hole 51a of the double-pole magnetized magnet 51 to connect the supporting block attachment piece 42 onto the lower surface of the supporting block 3 so that the supporting member 40 is integrated with the supporting block 3. In addition, the magnet 51 is fixed to the fitting projection 3a fitted into the penetration hole 51a by using adhesive agent so that it is integrated with the supporting block 3.

Figure 8:
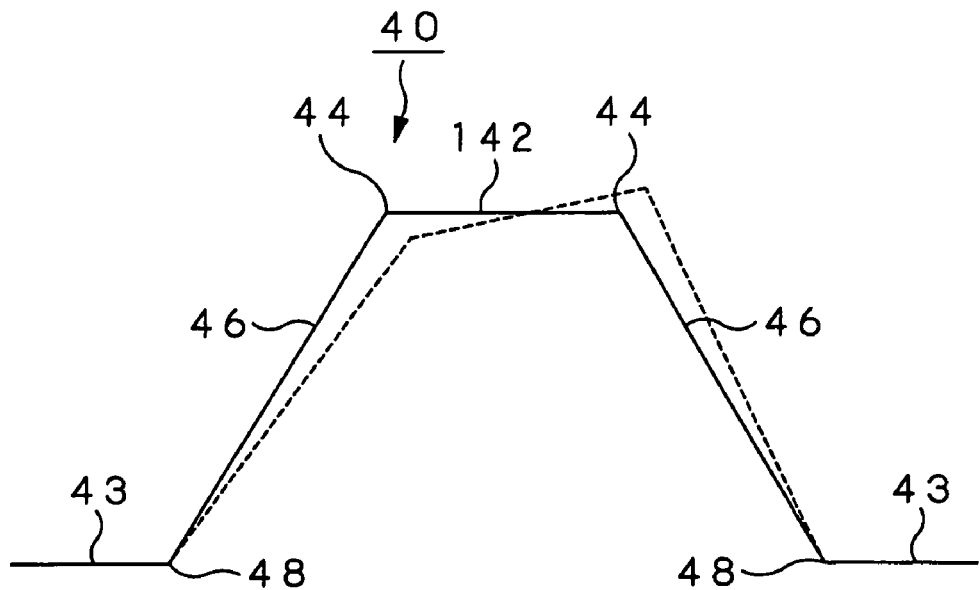
FIG. 8 is a front view showing the state where the supporting member shown in FIG. 7 has been caused to undergo displacement.

In the supporting mechanism of the supporting block 3 using the supporting member 40 shown in FIG. 7, four-linked mechanism is constituted by the supporting block 3, the base 16 and a pair of leg pieces 46, 46. The state of displacement of the supporting mechanism of the supporting block 3 in which the four-linked mechanism is constituted is shown in FIG. 8.

In the optical pick-up comprising the supporting mechanism using the supporting member 40 shown in FIG. 7, drive force is produced as the result of the fact that drive current is delivered to the voice coil 52 and current flows in coil within magnetic field of the double-pole magnetized magnet 51. When a force for driving the supporting block 3 substantially in horizontal direction is applied, elastic displacement portions 44, 44 formed at the connecting portion of the supporting block attachment piece 142 and leg pieces 46, 46 and elastic displacement portions 48, 48 formed at connecting portions where respective leg portions 46, 46 and respective base attachment pieces 43, 43 are connected are caused to undergo elastic displacement as shown in FIG. 8 so that the supporting member 4 is caused to undergo displacement. As a result, the supporting block attachment piece 142 is tilted. Thus, the supporting block 3 supported on the supporting block attachment piece 142 is tilted.

Since the supporting member 40 of this example is formed so as to have rigidity so that the supporting block attachment piece 142 and a pair of leg pieces 46, 46 are not easily elastically deformed, it is possible to linearly move the supporting block 3 to tilt it. Accordingly, the object lens 7 can be linearly tilted in accordance with warps, etc. of individual optical discs. Thus, it is possible to make a correction so that the optical axis of the object lens 7 is more precisely perpendicular to the surface of the optical disc.

Figure 9:
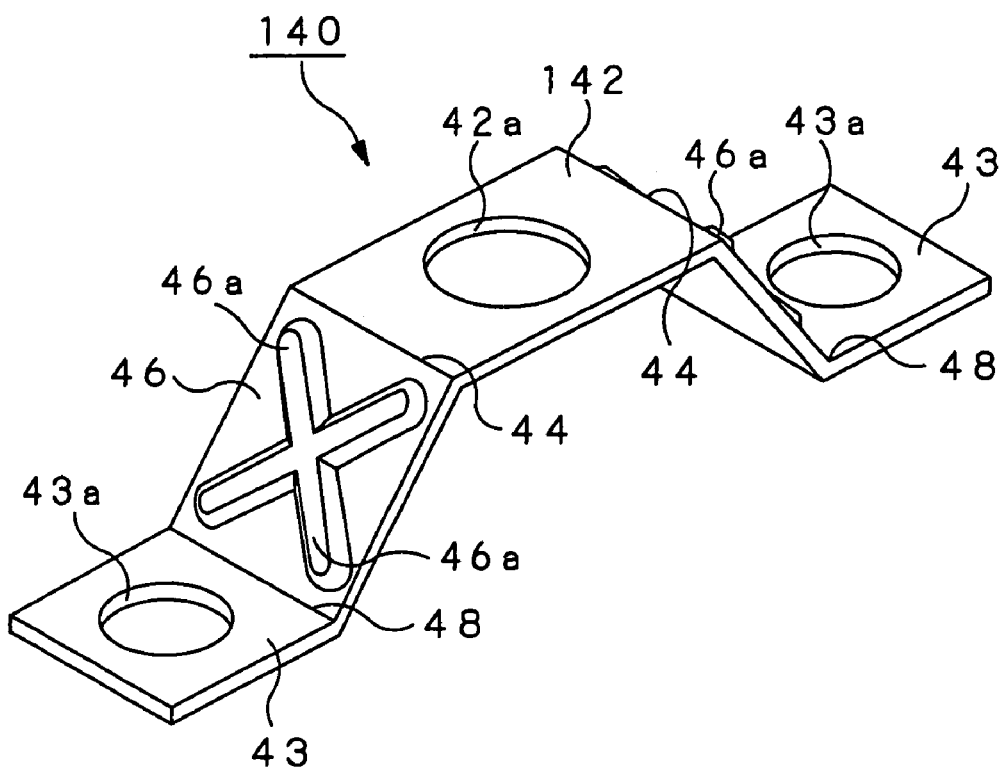
FIG. 9 is a perspective view showing a further example of the supporting member constituting the supporting mechanism.

Further, in the optical pick-up 104 according to the present invention, the supporting member 140 may be formed by using steel plate as shown in FIG. 9.

It is to be noted that common reference numerals are respectively attached to portions common to the previously described supporting member 40 shown in FIG. 7, and their detailed explanation will be omitted.

As shown in FIG. 9, the supporting member 140 is formed by bending or folding, e.g., spring steel plate having uniform thickness. Further, elastic displacement portions 44, 44 provided between the supporting block attachment piece 142 and the leg pieces 46, 46 and elastic displacement portions 48, 48 formed between the respective leg pieces 46, 46 and respective attachment pieces 50, 50 are constituted by bending or folding portions of spring steel plate.

At the pair of leg pieces 46, 46, projecting portions 46a, 46a for reinforcement projected toward one thickness direction are formed in cross form so that they are not caused to easily undergo elastic displacement. The supporting mechanism of the supporting block 3 using this supporting member 140 is also constituted so that elastic deformation of the respective leg pieces 46, 46 is prevented so that a pair of leg pieces 46, 46 securely function as four-linked mechanism.

Figure 10:
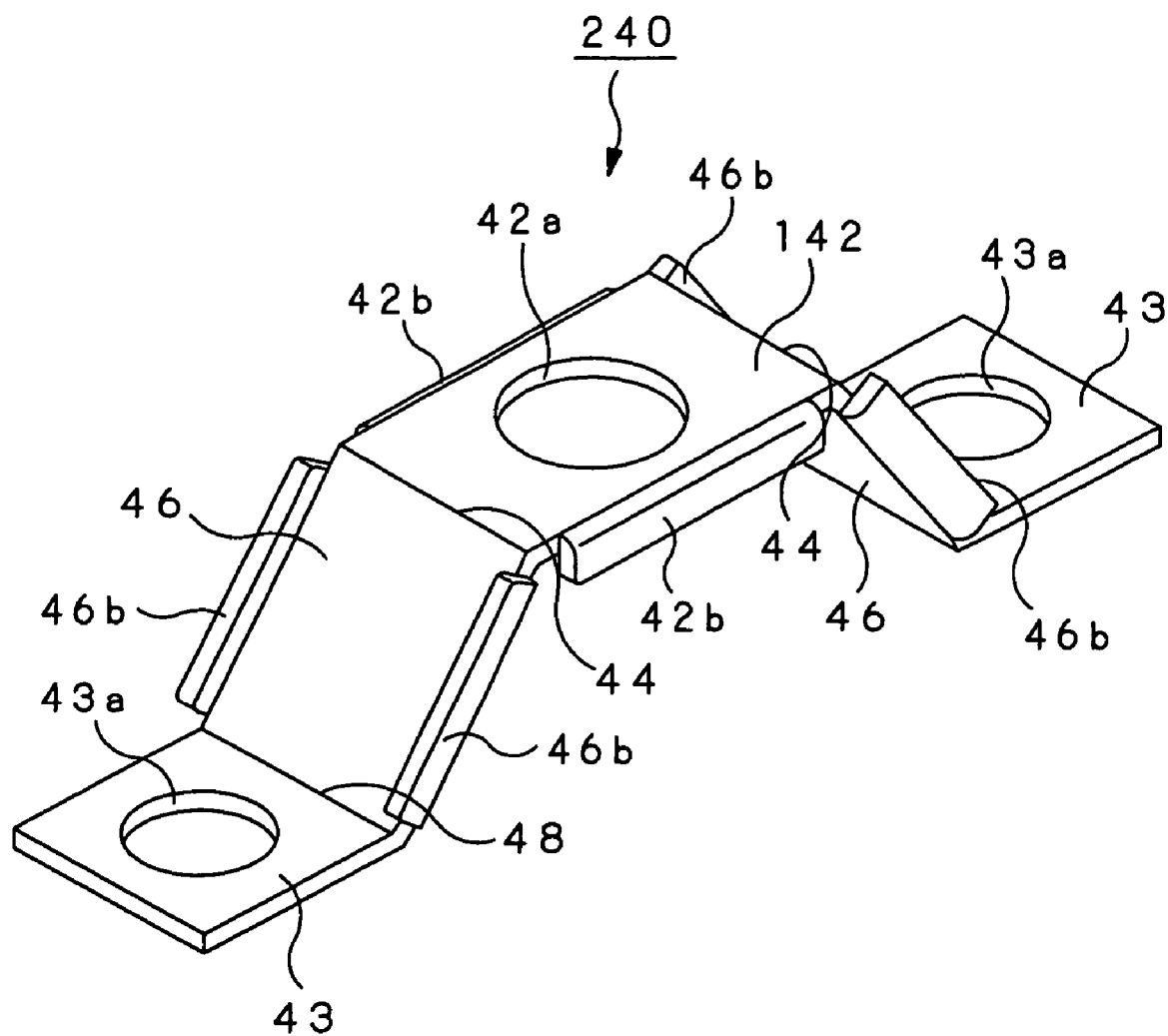
FIG. 10 is a perspective view showing a still further example of the supporting member constituting the supporting mechanism.

Furthermore, in the optical pick-up 104 according to the present invention, the supporting member 140 may be formed by using steel plate as shown in FIG. 10.

In this supporting member 240, rib portions for preventing elastic deformation are provided at the pair of leg pieces 46, 46 and the supporting block attachment piece 142, and the supporting member 240 is also formed by bending or folding, e.g., spring steel plate having uniform thickness.

It is to be noted that common reference numerals are respectively attached to portions common to the previously described supporting member 40 shown in FIG. 7.

Also at the supporting member 240, the elastic displacement portions 44, 44 provided between the supporting block attachment piece 142 and the leg pieces 46, 46, and the elastic displacement portions 48, 48 formed between the respective leg pieces 46, 46 and the respective base attachment pieces 43, 43 are constituted by bending portions of spring steel plate.

At both sides in the width direction of the supporting block attachment piece 142, there are provided ribs 42b projected (rising) toward one thickness direction. Similarly, at both sides in width direction of the respective leg pieces 46, 46, there are provided rib portions 46b projected (rising) toward one thickness direction. There is employed a configuration in which as the result of the fact that these ribs 42a, 42b are formed, elastic deformation of the supporting block attachment piece 42 and respective leg pieces 46, 46 is limited so that the pair of leg portions 46, 46 securely function as four-linked mechanism.

Then, the second embodiment of the optical pick-up to which the present invention is applied will be explained.

The optical pick-up (device) which will be explained below is adapted to attach supporting member to the base 16 without using the fixing screw 17 as in the previously described optical pick-up devices of respective examples, and is adapted to attach the supporting member to the base 16 by soldering.

It is to be noted that common reference numerals are respectively attached to portions common to the optical pick-up 104 shown in FIGS. 2 and 3 in the following explanation, and their detailed explanation will be omitted.

Figure 11:
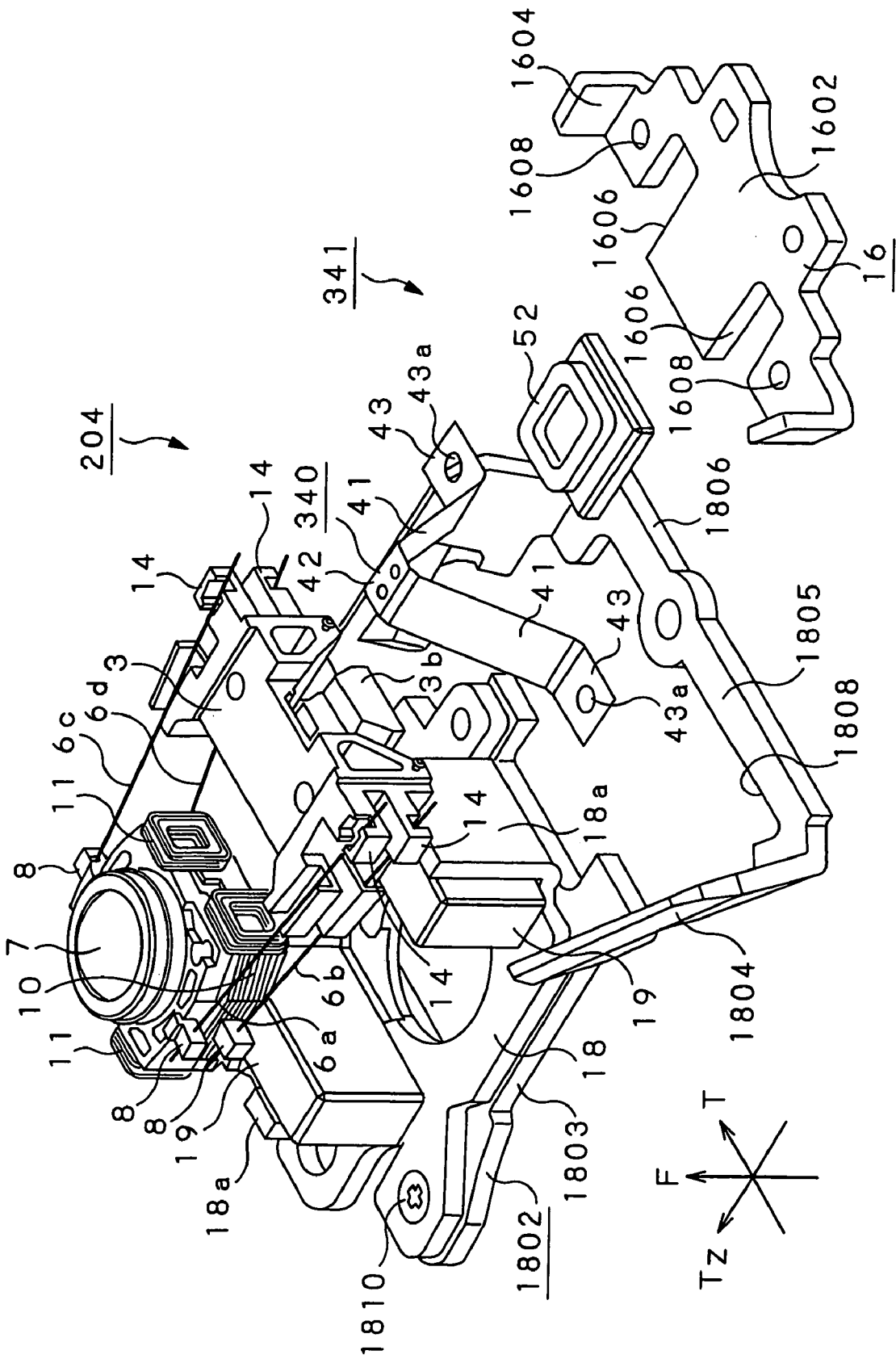
FIG. 11 is an exploded perspective view showing a second embodiment of the optical pick-up according to the present invention.

The optical pick-up 204 comprises, as shown in FIG. 11, a fixed frame 1802 in which yoke 18 to which magnets 19, 19 are attached is fixed. The fixed frame 1802 is adapted so that a fixed portion support frame 1805 is projected and formed in a manner projected toward the backward side from a yoke supporting portion 1803 to which the yoke 18 is attached. A supporting mechanism 341 for supporting the supporting block 3 so that it can be tilted is attached through the fixed portion support frame 1805. The supporting mechanism 341 is attached onto a connecting portion 1806 provided at the back end side of the fixed portion support frame 1805 in the state where the base 16 is fixed. At this time, the base 16 is attached to the fixed portion support frame 1805 in such a manner that a supporting member 340 supported by the base 16 is positioned within an opening portion 1808.

Figure 12:
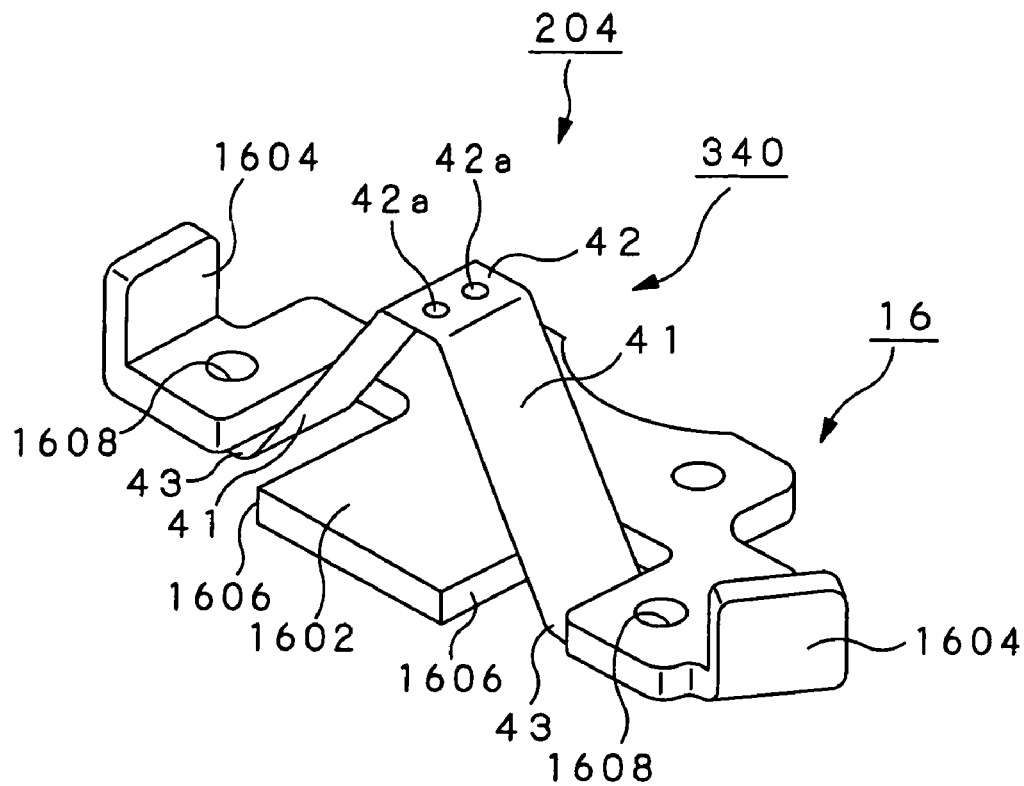
FIG. 12 is a perspective view showing supporting mechanism comprising supporting member.

In this embodiment, the supporting member 340 constituting the supporting mechanism 341 is formed by bending or folding belt-shaped leaf spring material similarly to the supporting member used in the previously described first embodiment, and comprises a supporting block attachment piece 42 fixed on the supporting block 3, and a pair of leg pieces 41, 41 extended from both ends of the supporting block attachment piece 42. From front end portions of these leg pieces 41, 41, there are provided base attachment pieces 43, 43 for attaching the supporting member 340 to the base 16. The supporting member 340 is attached to the base 16 by soldering. In view of the above, the base 16 is formed by metallic material by which soldering can be made. As shown in FIGS. 11 and 12, the base 16 has width which is substantially the same width as width extending between a pair of rising pieces 1804, 1804 formed at both sides of the fixed supporting frame 1805, and is adapted so that a pair of rising pieces 1604, 1604 are formed at both sides opposite to each other in the state where they are bent or folded. At one edge portions in forward and backward directions of the plane surface portion 1602 of the base 16, a pair of cut portions 1606, 1606 are formed at a predetermined spacing in the width direction. Moreover, a pair of projections 1608, 1608 projected toward the lower surface side are provided in a projected manner in the state positioned at respective rising pieces 1604, 1604 side on the plane surface 1602 of the base 16.

In this example, at base attachment pieces 43, 43 of the supporting member 340, as shown in FIG. 11, there are bored engagement holes 43a, 43a with which projections 1608, 1608 are engaged.

Figure 13:
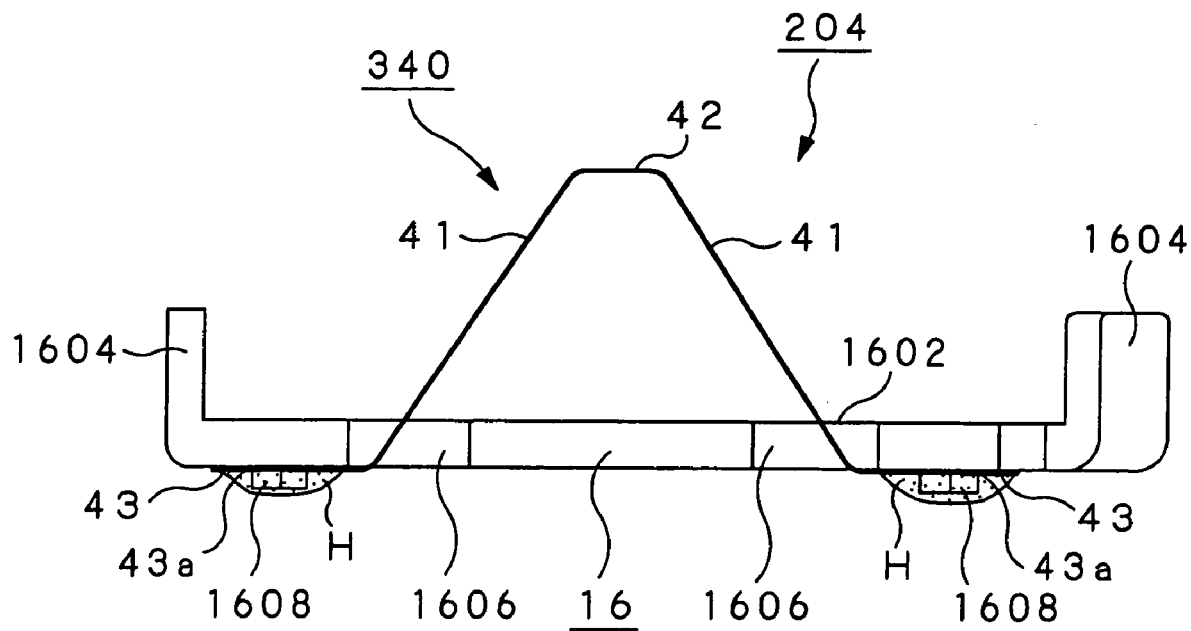
FIG. 13 is a front view showing the state where the supporting member is attached on base.

Further, as shown in FIGS. 12 and 13, in order to attach the supporting member 340 to the base 16, respective leg pieces 41, 41 of the supporting member 340 are inserted into respective cut portions 1606, 1606 to face base attachment pieces 43, 43 provided at front end portions of the respective leg pieces 41, 41 toward the lower surface side of plane surface portion 1602 of the base 16.

Then, in the state where projections 1608, 1608 are engaged with engagement holes 43a, 43a bored at the respective base attachment pieces 43, 43 so that positioning has been performed, the portion between the edge portions of the respective base attachment pieces 43, 43 and lower surface portions of the plane surface portion 1602 faced to the edge portions, and the portion between engagement holes 43a, 43a peripheral portions of the respective base attachment pieces 43, 43 and the respective projections 1608, 1608 are soldered so that attachment onto the base 16 of the supporting member 340 is performed.

Further, in order to support the supporting block 3 onto the supporting member 340, attachment portion 3b provided at the lower surface side of the supporting block 3 is mounted on the supporting block attachment piece 42 to insert a pair of fitting projections projected at the lower surface side of the supporting block 3 into penetration holes 42a, 42a board at the supporting block attachment piece 42. Further, the supporting block 3 is bonded, by adhesive agent, onto the supporting block attachment piece 42 so that it is integrated with respect to the supporting member 340.

Attachment with respect to the yoke 18 of the base 16 is performed by arranging the base 16 to which the supporting member 340 is attached so that it is positioned between respective rising pieces 1804, 1804 of the yoke 18 to oppose the respective rising pieces 1604, 1604 to respective rising pieces 1804, 1804 of the yoke 18 side to bond or connect these rising pieces 1604, 1604 and rising pieces 1804, 1804 therebetween by using solder H or adhesive agent.

In this case, attachment with respect to the fixed frame 1802 of the yoke 18 is performed by using fixing screws 1810.

Then, a method of manufacturing the supporting member 340 which can perform attachment with respect to the base 16 by using the above-described solder will be explained.

In order to manufacture the supporting member 340, a member having predetermined dimensions is cut from flat plate shaped spring steel plate to allow the member obtained at the cutting step to undergo bending processing at press step thereafter to perform heat treatment at heat treatment step in order to increase hardness. Then, plating processing to implement such a metal plating to facilitate attachment of solder onto the surface of the member, etc. is performed.

There is the possibility that external force may be applied to the supporting member 340 at platting processing step so that it is deformed. On the other hand, in order to control tilt angle of the object lens 7 with high accuracy, it is necessary to support the supporting block 3 by the supporting member 340 in the state where it is caused to undergo positioning with high accuracy. From this fact, it is necessary to suppress unevenness of spring constant of the supporting member 340. Accordingly, it is preferable to perform plating processing step before press step for allowing the spring member to undergo bending processing.

Moreover, since when heat treatment step is performed, the surface of the supporting member 340 formed by spring steel plate is oxidized so that there results disadvantageous state in implementing plating, it is preferable to perform plating processing step before heat treatment step.

When these conditions are taken into consideration, it is preferable to manufacture the supporting member 340 by, e.g., process steps described below.

1) cutting step, plating step, press step, heat treatment step 2) plating step, cutting step, press step, heat treatment step Further, also in the supporting member 340 of this example, projecting portion for enhancement may be formed at the leg piece 41.

As described above, fixing of the supporting member 340 with respect to the base 16 is performed by using solder or adhesive agent without attaching the supporting member 340 to the base 16 by mechanical fastening by using fixing screws so that there is no possibility that mechanical fastening force may be applied to the supporting member 340. Accordingly, there is also no possibility that fastening force may be partially applied so that the supporting member 340 is deformed. Thus, it is possible to support the supporting block 3 with high accuracy.

Meanwhile, in the optical pick-up 204 shown in FIG. 11, voice coil 52 constituting drive mechanism 5 for driving the supporting block 3 is supported by attachment portion 3b provided at the lower surface side of the supporting block 3, and magnet 51 is disposed on plane surface portion 1602 of the base 16. Power supply of drive current to the voice coil 52 is performed through printed wiring board (not shown) attached to the back (rear) surface side of the supporting block 3.

The optical pick-up 204 also comprises a control system as shown in the previously described FIG. 6, and serves to deliver a drive current to the voice coil 52 of the drive mechanism 5 from the coil drive circuit 22 in accordance with output of tilt detection sensor 21 to allow the lens holder 2 to undergo tilt displacement in conformity with inclination of the disc surface by warp, etc. of the optical disc 102 so that control of tilt angle such that the optical axis of the object lens 7 is perpendicular to the recording surface of the optical disc 102 is performed.

While the above-described optical pick-up devices 104, 204 are adapted to support only one object lens 7 with respect to the lens holder 2, the present invention may be applied also to optical pick-up 304 comprising plural object lenses 71, 72.

Figure 14:
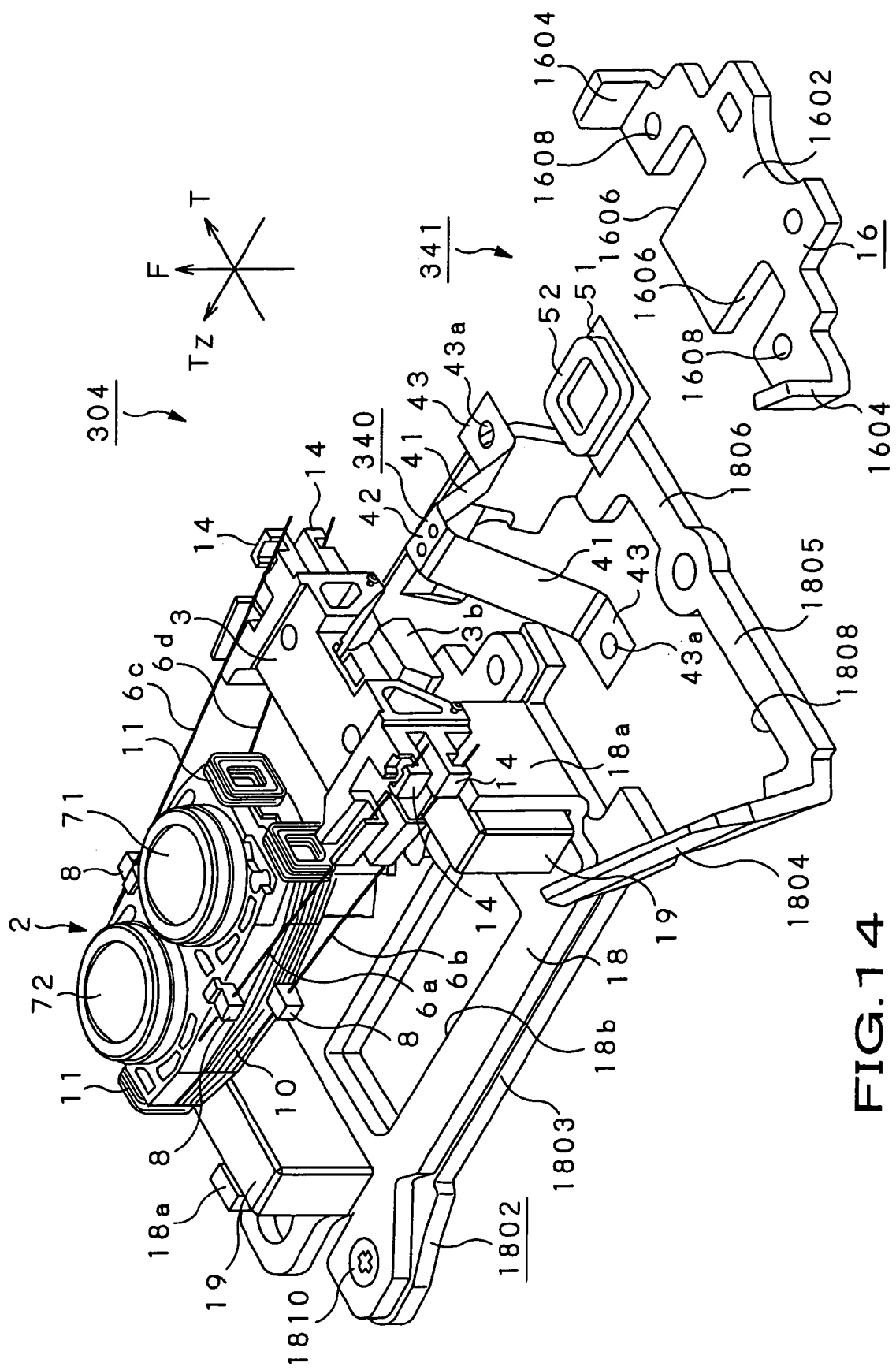
FIG. 14 is a perspective view showing a third embodiment of the optical pick-up according to the present invention.

The optical pick-up 304 shown in FIG. 14 is used in an optical disc apparatus in which plural kinds of optical discs where plural kinds of light beams having different wave lengths are selectively used so that recording or reproduction of information signals is performed are selectively used as recording media. As an optical disc apparatus of this kind, there is, e.g., an optical disc apparatus in which a first optical disc where light beams having wavelength of 400 to 410 nm are used so that recording or reproduction of information signals is performed, a second optical disc where light beams having wavelength of 650 to 660 nm are used so that recording or reproduction of information signals is performed, and a third optical disc where light beams having wavelength of 760 to 800 nm are used so that recording or reproduction of information signals is performed are used as recording media.

The optical pick-up 304 used in the optical disc apparatus in which plural optical discs respectively using such light beams having wavelengths different from each other as stated above comprises, as shown in FIG. 14, plural object lenses 71, 72 in correspondence with light beams having wavelengths different from each other. Here, the first object lens 71 is used for the purpose of converging, e.g., light beams having wavelength of 400 to 410 nm onto the first optical disc, and the second object lens 72 is used for converging light beams having wavelength of 650 to 660 nm and light beams having wavelength of 760 to 800 nm onto the second or third optical disc.

The optical pick-up 304 shown in FIG. 14 comprises, as shown in FIG. 14, similarly to the previously described optical pick-up 104, a single lens holder 2, wherein the first and second object lenses 71, 72 are attached to the lens holder 2.

Here, the first and second object lenses 71, 72 are arranged in parallel in tangential direction Tz which is extending direction of supporting arms 6a to 6d. Here, the first object lens 71 is arranged in the state positioned at the fixed portion 3 side serving as the fixed portion side of the supporting arms 6a to 6d, and the second object lens 72 is arranged in the state positioned at the front end side of the lens holder 2.

The lens holder 2 to which the first and second object lenses 71, 72 are attached is supported by the supporting arms 6a to 6d at both sides of the intermediate portion between optical axes of the first and second object lenses 71, 72, in extending direction of the supporting arms 6a to 6d. Namely, the lens holder 2 is supported so that it can be caused to undergo displacement in biaxial directions perpendicular to each other of at least the focus direction F and the tracking direction T by fixing front end portions of the supporting arms 6a to 6d at the wire supporting portions 8 provided at both sides of the intermediate portion between optical axes of the first and second object lenses 71, 72.

It is to be noted that it is desirable that both sides of center of gravity of the lens holder 2 to which the focus coil 10 and the tracking coils 11, 11 are attached are located at the position supported by front end portions of the supporting arms 6a to 6d of the lens holder 2. As the result of the fact that such positions are supported, the first and second object lenses 71, 72 are permitted to stably undergo displacement in the focus direction F and in the tracking direction T without producing torsion, etc.

Further, the optical pick-up 304 shown in FIG. 14 also supports the supporting block 3 by using the supporting mechanism 341 constituted similarly to the above-described optical pick-up 204 shown in FIG. 11. Since the drive mechanism 5 for tilting the supporting mechanism 341 and the supporting block 3 has the configuration similar to the above-described optical pick-up 204 shown in FIG. 11, the above-described explanation is referred and the detailed explanation is omitted.

Also at the optical pick-up 204 in which two object lenses 71, 72 shown in FIG. 14 are attached to common lens holder 2, adjustment of tilt angle can be made without increasing the number of parts. As a result, increase in weight of movable parts resulting from the fact that plural object lenses 71, 72 are used is suppressed. Thus, drive control of the object lenses 71, 72 can be more stably performed by less drive current.

The optical disc apparatus using the optical pick-up 304 which can stably perform drive control of the object lenses 71, 72 by less drive current not only can realize saving of power, but also can precisely perform drive displacement of the object lenses 71, 72 in accordance with focus error signal, tracking error signal, or tilt control signal. Thus, it is possible to realize improvement of recording or reproducing characteristic of information signals.

It is to be noted that while the present invention has been described in accordance with preferred embodiments thereof in the accompanying drawings and described in detail, it should be understood by those ordinarily skilled in the art that the invention is not limited to embodiments, but various modifications, alternative constructions or equivalents can be implemented without departing from the scope and spirit of the present invention as set forth by appended claims.

The invention claimed is:

1. An optical pick-up comprising:
a lens holder to which an object lens is attached, and to be moved in a focus direction in parallel to an optical axis of the object lens and in a tracking direction perpendicular to the optical axis of the object lens;

a supporting block for movably supporting the lens holder in the focus direction and in the tracking direction;

a supporting member formed of a bent or folded spring steel plate of uniform thickness to provide a pair of leg pieces for supporting and allowing the supporting block to be tilted by fixing front end sides of the leg pieces onto a base, the leg pieces being arranged such that spacing between the leg pieces increases as a distance from a side at which the supporting block is supported increases toward the front end side, the leg pieces including reinforcement portions whereby elastic deformation of the leg pieces is restrained; and a drive mechanism for applying a drive force to the supporting block so as to tilt the supporting block by changing the angular relationship of the pair of leg pieces, thereby tilting the lens holder which is supported by the supporting block.

2. The optical pick-up as set forth in claim 1, wherein the drive mechanism is composed of a voice coil and a rod-shaped magnet, the magnet being attached to the supporting block, the voice coil being attached to the base opposite to the magnet.

3. The optical pick-up as set forth in claim 1, wherein the drive mechanism is composed of a voice coil and a rod-shaped magnet, the voice coil being attached to the supporting block, the magnet being attached to the base opposite to the voice coil.

4. The optical pick-up as set forth in claim 1, wherein the pair of leg pieces are arranged so as to take linear symmetry with respect to a virtual line passing through the optical axis of the object lens parallel to the focus direction.

5. The optical pick-up as set forth in claim 1, wherein the pair of leg pieces are arranged so as to take linear symmetry with respect to virtual line passing through the center of the optical axis and in a length direction of the supporting block extending in the tracking direction perpendicular to the optical axis direction of the object lens.

6. The optical pick-up as set forth in claim 1, wherein the supporting member is adapted so that the leg pieces are connected to both ends of a supporting block attachment piece fixed to the supporting block through an elastic displacement portion and attachment pieces are provided at the front end portions of the respective leg pieces through the elastic displacement portion, the supporting member being attached on the base through the attachment pieces, the leg pieces being caused to undergo displacement with the respective elastic displacement portions being a displacement point.

7. The optical pick-up as set forth in claim 1, wherein when a drive force for tilting the supporting block is applied from the drive mechanism, the pair of leg pieces oscillate as a four-linked mechanism constituted by the supporting block, the base and the pair of leg pieces.

8. The optical pick-up as set forth in claim 1, wherein two object lenses are supported at the lens holder in the state where they are arranged in a tangential direction perpendicular to the tracking direction.

9. An optical disc apparatus including drive means for rotationally driving an optical disc in the state where the optical disc is held, and an optical pick-up for irradiating light beams serving to perform recording or reproduction of information signals on and from the optical disc rotationally driven by the drive means, and for detecting reflected light beams reflected from the optical disc, the optical pick-up comprising:

a lens holder portion to which an object lens is attached, and to be moved in a focus direction in parallel to an optical axis of the object lens and in a tracking direction perpendicular to the optical axis of the object lens;

a supporting block for movably supporting the lens holder in the focus direction and in the tracking direction;

a supporting member formed of a bent or folded spring steel plate of uniform thickness to provide a pair of leg pieces for supporting and allowing the supporting block to be tilted by fixing front end sides of the leg pieces onto a base, the leg pieces being arranged such that spacing between the leg pieces increases as a distance from a side at which the supporting block is supported increases toward the front end side, the leg pieces including reinforcement portions whereby elastic deformation of the leg pieces is restrained; and a drive mechanism for applying a drive force to the supporting block so as to tilt the supporting block by changing the angular relationship of the pair of leg pieces, thereby tilting the lens holder which is supported by the supporting block.

10. The optical disc apparatus as set forth in claim 9, wherein the drive mechanism is composed of a voice coil and a rod-shaped magnet, the magnet being attached to the supporting block, the voice coil being attached to the base opposite to the magnet.

11. The optical disc apparatus as set forth in claim 9, wherein the drive mechanism is composed of a voice coil and a rod-shaped magnet, the voice coil being attached to the supporting block, the magnet being attached to the base opposite to the voice coil.

12. The optical disc apparatus as set forth in claim 9, wherein the pair of leg pieces are arranged so as to take linear symmetry with respect to a virtual line passing through the optical axis of the object lens parallel to the focus direction.

13. The optical disc apparatus as set forth in claim 9, wherein the pair of leg pieces are arranged so as to take linear symmetry with respect to a virtual line passing through the the center of the optical axis and in a length direction of the supporting block extending in the tracking direction perpendicular to the optical axis direction of the object lens.

14. The optical disc apparatus as set forth in claim 9, wherein the supporting member is adapted so that the leg pieces are connected to both ends of a supporting block attachment piece fixed to the supporting block through an elastic displacement portion and attachment pieces are provided at front end portions of the respective leg pieces through the elastic displacement portion, the supporting member being attached on the base through the attachment pieces, the leg pieces being caused to undergo displacement with the respective elastic displacement portions being a displacement point.

15. The optical disc apparatus as set forth in claim 9, wherein when a drive force for tilting the supporting block is applied from the drive mechanism, the pair of leg pieces oscillate as a four-linked mechanism constituted by the supporting block, the base and the pair of leg pieces.

\* \* \* \* \*